(No Model.) 3 Sheets—Sheet 1.

J. P. H. GASTRELL.
FASTENER FOR MEETING RAILS OF SASHES.

No. 475,765. Patented May 31, 1892.

Witnesses:
Fred D. Goodwin
R. Schleicher

Inventor:
James P. H. Gastrell
By his Attorneys
Howson & Howson (No Model.) 3 Sheets—Sheet 2.
J. P. H. GASTRELL.
FASTENER FOR MEETING RAILS OF SASHES.
No. 475,765. Patented May 31, 1892.
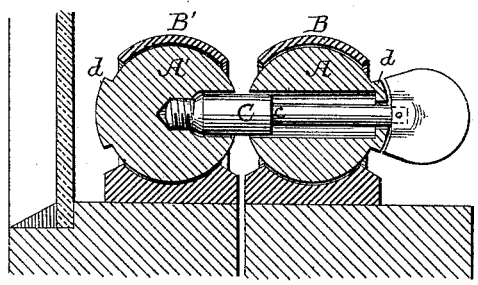
FIG. 8.
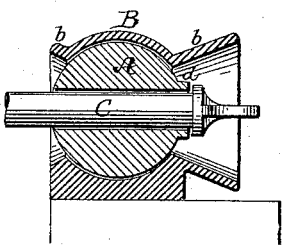
FIG. 7.
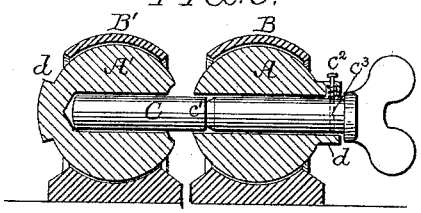
FIG. 9.
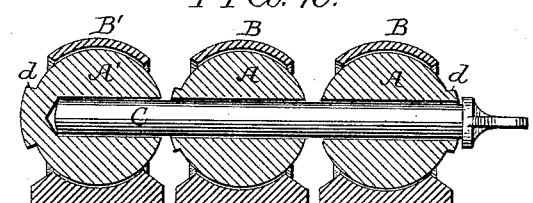
FIG. 10.
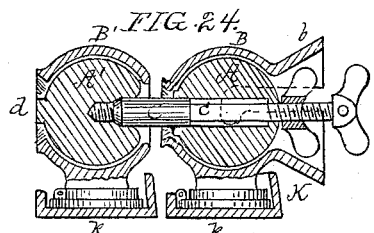
FIG. 24.
FIG. 20.
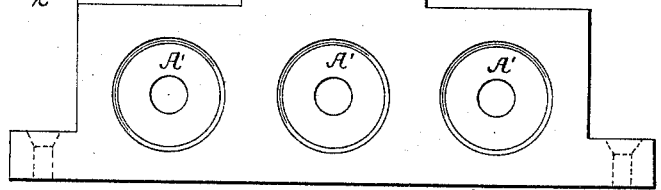
FIG. 21. FIG. 11.
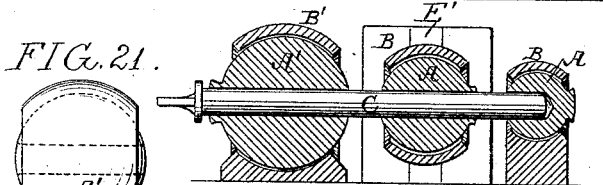
FIG. 12.
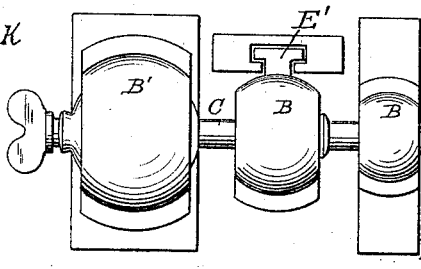
Witnesses:
Fred L. Goodwin
R. Schleicher
Inventor:
James P. H. Gastrell
By his Attorneys
Howson & Howson (No Model.) 3 Sheets—Sheet 3.

J. P. H. GASTRELL.
FASTENER FOR MEETING RAILS OF SASHES.

No. 475,765. Patented May 31, 1892.

Witnesses:
Fred D. Goodwin
R. Schleicher

Inventor:
James P. H. Gastrell
By his Attorneys
Howson & Howson

UNITED STATES PATENT OFFICE.

JAMES P. H. GASTRELL, OF WIESBADEN, GERMANY.

FASTENER FOR MEETING-RAILS OF SASHES.

SPECIFICATION forming part of Letters Patent No. 475,765, dated May 31, 1892.

Application filed June 13, 1891. Serial No. 396,117. (No model.)

*To all whom it may concern:*

Be it known that I, JAMES PLAISTER HARRISS GASTRELL, a subject of the Queen of Great Britain and Ireland, domiciled in Nassau, Germany, and residing therein at 2 Theodorenstrasse, Wiesbaden, but temporarily a resident of the United States, at 48 Bowdoin street, Boston, Massachusetts, have invented certain Improvements in Fasteners for Meeting-Rails of Sashes, &c., of which the following is a specification.

The object of my invention is to provide a device for securing together the sashes of windows or for the purpose of fastening doors or gates or for bolting, riveting, or securing together other separated objects.

Figure 1:
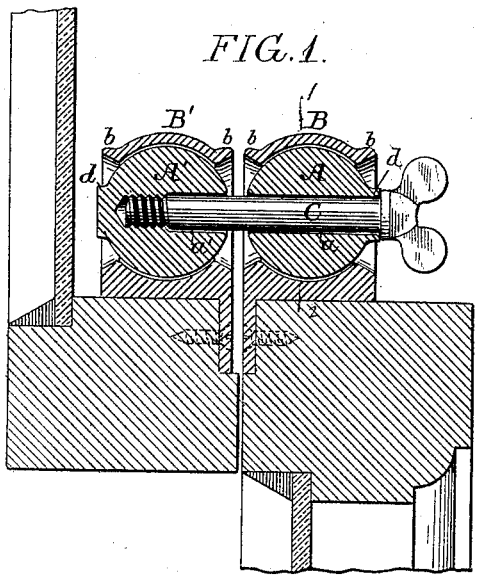
Figure 2:
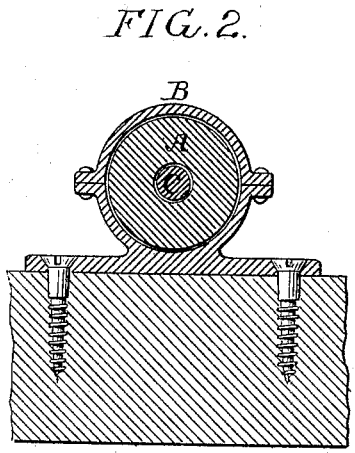
Figure 3:
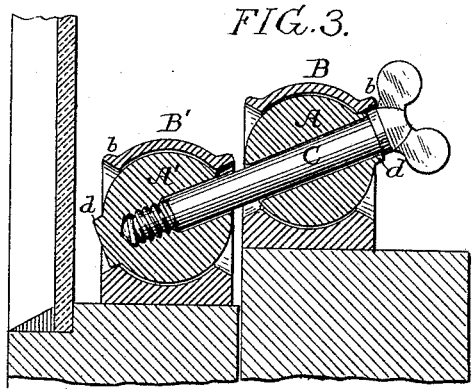
Figure 4:
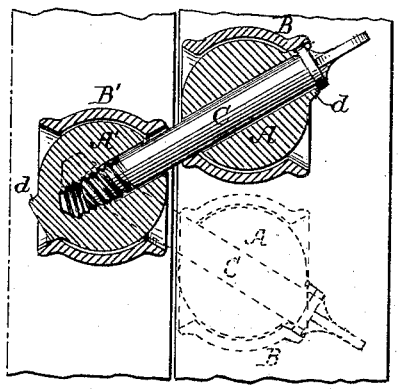

In the accompanying drawings, Figure 1 is a sectional elevation of my improved securing device in its preferred form, showing its application to the meeting-rails of window-sashes. Fig. 2 is a sectional view of the same on the line 1 2, Fig. 1. Figs. 3 and 4 are views illustrating the use of the bolt where the sashes have deviated to some extent from their normal position, and Figs. 5 to 24 are views illustrating different modifications of my invention and showing their application to various purposes.

In carrying out my invention I employ two blocks or spheres A A', which are provided with openings $a$ $a'$ for the passage of the locking-bolt, the opening $a$ in one of these blocks extending, preferably, but part way through the block. These blocks are mounted so as to be capable of adjustment in various directions, so that the locking-bolt used for securing the two together may be readily inserted in both passages, even where the objects to which such blocks are secured have deviated to a considerable extent from the normal position. The blocks are preferably in the form of spheres A A', which are set, respectively, within spherical bearings B B', provided with lips $b$, which, together with stops $d$ on the spheres, limit the extent of movement of such spheres in their sleeves and control the distance within which the bolting may take place. The sphere A carries a locking-bolt C, which is adapted to slide therein and which may be inserted part way into the passage $a'$ in the sphere A', the spheres being capable of adjustment to such an extent as to permit the passage of the bolt from one sphere to the other, even where the articles to which the spheres are secured have deviated to an extent which would not permit their being locked by any of the ordinary devices employed for that purpose or where they are purposely so deviated.

The foregoing description will suffice to explain the construction in its simplest form of the device invented by me and its application to any separated objects—such as the meeting-rails of a sash or a door or gate and its locking-post—will be readily understood.

The bolt may be of any desired form in cross-section and is provided with a handle or knob at one of its ends or side by which it may be conveniently operated. In cases where it is desirable that the two objects being secured together should be drawn toward each other and locked I preferably provide the inner end of the bolt with a male thread, which engages with a female thread in the sphere A', so that after the bolt has reached the locked position one or more turns will suffice to draw the parts together and secure them to each other.

In Figs. 3 and 4 I have illustrated in sectional elevation and plan the application of a bolting device of this character to the meeting-rails of window-sashes in which the sashes have deviated to a considerable extent from their normal position.

Figure 5:
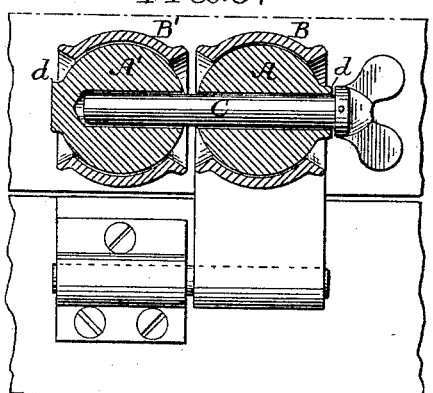
Figure 6:
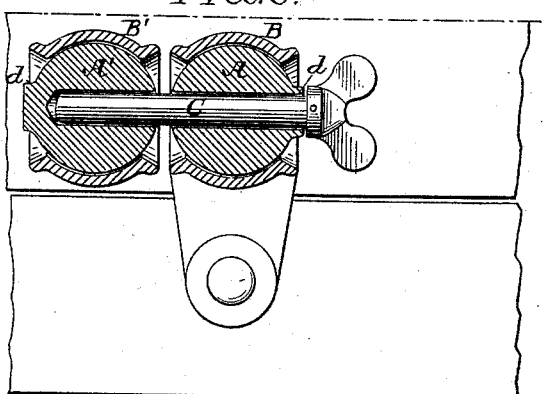

The modifications illustrated, respectively, in Figs. 5 and 6 show one of the sleeves or spherical bearings B, pivoted to the inner or lower sash and adapted to be thrown into or out of line with the sphere A', which is mounted in its sleeve B' on the upper or outer sash. These constructions are desirable where the parts to be locked together are liable to deviate to any considerable extent from the normal position—as in doors and gates, for instance—for the reason that they permit a greater range of movement.

In Fig. 7 is illustrated a modification in which the lips $b$ are continued out for some distance to form a guide or shield for the bolt C, and, if desired, the shield may be set at some distance from the lip, so as to permit the ready operation of the bolt C.

Fig. 8 shows a modified construction of the bolt C in which one end of the bolt is of less diameter than the main body, so that a shoulder $c$ is formed on the bolt which is adapted to fit against a shoulder at the outer end of the sphere A when the parts are unlocked, the withdrawal or accidental slipping out of the bolt being thus prevented, and the said shoulders may, if desired, have threads to lock the parts in the bolting position. Another means of accomplishing this object is shown in Fig. 9, the bolt in this case being provided with a groove $c'$, with which is adapted to engage a small spring-bolt $c^2$, the groove being preferably cut, as shown in Fig. 9, with an abrupt shoulder toward the locking end, so that while it does not interfere with the locking together of the spheres it will prevent the bolt from being drawn out too far, although, if desired, the groove may be cut, so that when in engagement with the bolt $c^2$ it will be locked and prevented from moving in either direction; or the bolt may also be provided with a second groove of this character, as shown by dotted lines at $c^3$, and may be locked when in engagement with both of the spheres A A'.

Fig. 10 illustrates a modification in which a long bolt and two bolt-holding spheres A are employed, the intermediate sphere being carried upon a sliding stem E or a sliding block E', as shown in Figs. 11 and 12, which represent, respectively, a vertical section and a plan view of a locking device of this character.

Figure 13:
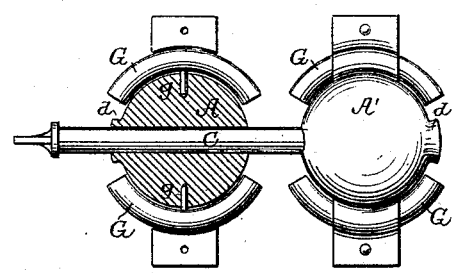
Figure 14:
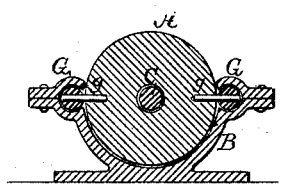
Figure 15:
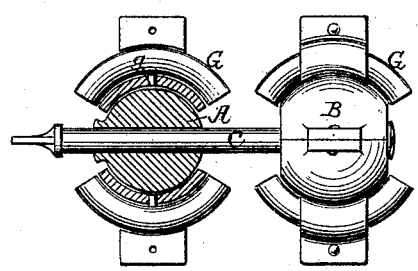
Figure 16:
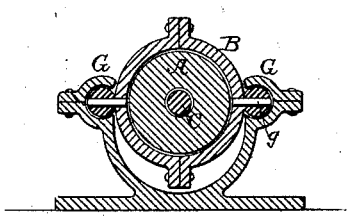

In Figs. 13 and 14, which represent, respectively, a plan and sectional view of another modification, I have shown the spheres A A', carried by pivot-pins $g$, projecting from segments G, mounted in suitable curved guides G', the spheres mounted in this manner being capable of adjustment to the same extent as those mounted in the manner shown in Fig 1. Similar views, marked, respectively, Figs. 15 and 16, show the spheres mounted in spherical bearings, which latter are pivoted to slides G in the same manner as are the spheres shown in Figs. 13 and 14.

Figure 17:
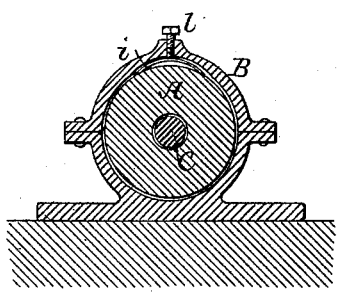

In Fig. 17, which illustrates a sleeve and sphere of the character shown in Fig. 2, I have shown a bearing-sleeve provided with a friction-spring $i$, bearing upon the sphere A, the pressure of the spring being adjusted by means of a set-screw I.

Figure 18:
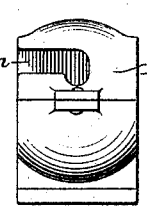

In some cases where it is desirable that the bolt should be thrown out of the way when the sashes are unlocked I provide openings $m$ in the opposite sides of the sleeve B, so that the bolt may be turned around at right angles to the line of bolting, as illustrated in Fig. 18.

Figure 19:
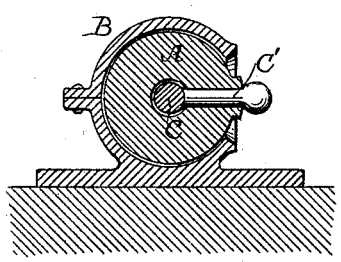

Fig. 19 represents a modification in which the bolt C is provided with an extension C', which projects through the side of the sleeve B to permit the operating of the bolt from the side of the sleeve, or, if desired, the bolt may be operated by a key projecting through the side of the sphere and occupying the place of the extension C'.

In Fig. 20 is illustrated a modification in which a number of spheres A' are employed, into any one of which the bolt may be inserted, and the gate or sash to which it is applied may be opened to a greater or less extent, as desired. This latter modification is also desirable for use in situations where the variation in temperature and moisture is so great as to cause a considerable deviation of the parts to be secured together, as the locking-bolt may be inserted in any one of the sleeves with which it may be in line.

In Fig. 21 is shown a modification in which the sleeve A' is hinged to a plate $k$, adapted to turn within a shell or casing K and so permit of an extensive movement of the sleeve; or, if desired, the bearing-sleeves may be mounted in spherical bearings to permit of still further movement, the spherical bearings being hinged to the plate $k$.

Figure 22:
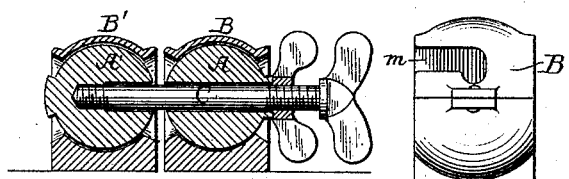
Figure 23:
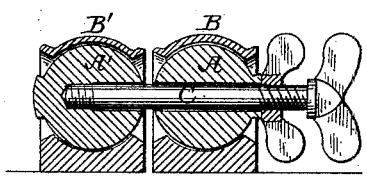

Fig. 22 represents a view similar to Fig. 1, in which the locking-bolt is made of greater length in order to permit a greater range of adjustment, the bolt in this case being provided with a second thread at its opposite end, on which is placed a winged nut to adjust the length of bolt to suit different variations of the parts. Fig. 23 is a similar view showing the threads on the bolt of different inclination, so that the locking may be effected more readily; and in Fig. 24 I have illustrated the main features of my invention combined in a single structure.

It will be understood, however, that I do not limit myself to any of the specific constructions herein shown or described, my invention comprising, broadly, the employment of two spherical bolt-receiving sleeves and bearings for such sleeves which will permit their movement and adjustment with relation to each other.

Having thus described my invention, I claim and desire to secure by Letters Patent—

1. A fastening or securing device comprising the spherical blocks having passages therein for the reception of a bolt, a bolt adapted to said passages, and bearings for said blocks, substantially as specified.

2. The combination, in a fastening device, of the spherical blocks, universal circular bearings therefor, passages in said blocks, and a bolt adapted to such passages, substantially as specified.

3. The combination, in a fastening device, of the spherical blocks, universal bearings therefor, passages in said blocks for the locking-bolt, the passage in one of said blocks being provided with a screw-thread, and a locking-bolt having a screw-thread adapted to engage with the screw-thread in said block, substantially as specified.

4. The combination, in a fastening device, of the blocks or spheres, bearings therefor, passages in said blocks or spheres for the locking-bolt, the passage in one of said blocks or spheres being provided with a screw-thread, and a locking-bolt having a screw-thread adapted to engage with the screw-thread in said block or sphere, said blocks or spheres having stops and said bearings having lips which control the extent of movement of the blocks or spheres, substantially as specified.

5. The combination, in a fastening device, of the blocks or spheres, bearings therefor, passages in said blocks or spheres for the locking-bolt, the passage in one of said spheres being provided with a screw-thread, a locking-bolt having a screw-thread adapted to engage with the screw-thread in said sphere, and an adjusting-nut on said locking-bolt, substantially as specified.

6. The combination, in a fastening device, of the blocks or spheres, bearings therefor, passages in said blocks or spheres for the locking-bolt, the passage in one of said spheres being provided with a screw-thread, the locking-bolt having a screw-thread adapted to engage with the screw-thread in said sphere, an adjusting-nut on said locking-bolt, said locking-bolt having a reduced shank, and a stop on one of said spheres to prevent the withdrawal of the bolt, substantially as specified.

7. The combination, in a fastening device, of the blocks or spheres, bearings therefor, passages in said blocks or spheres for the locking-bolt, the locking-bolt, and a grooved or recessed portion in one of the said bearings to permit the turning of the bolt at an angle to the line of bolting, substantially as specified.

8. The combination, in a fastening device, of the blocks or spheres, passages therein for the reception of the bolt, a locking-bolt, bearings for said blocks or spheres, and a conical shield projecting from one of said bearings and adapted to protect the end of the bolt, substantially as specified.

9. The combination, in a fastening device, of the blocks or spheres, passages therein for the reception of the bolt, a locking-bolt, bearings for said blocks or spheres, hinged foot-plates on which said bearings are mounted, said foot-plates being free to rotate, substantially as specified.

In testimony whereof I have signed my name to this specification in the presence of two subscribing witnesses.

JAMES P. H. GASTRELL.

Witnesses:
HATTIE E. BLAKE,
CHAS. HALL ADAMS.